United States Patent [19]

Hamada et al.

[11] Patent Number: 4,734,474

[45] Date of Patent: Mar. 29, 1988

[54] FLUORINE-CONTAINING SULFONYL POLYMER

[75] Inventors: Masato Hamada, Yokohama; Tetsuro Ohta, Tokyo, both of Japan

[73] Assignee: Asahi Kasei Kogyo Kabushiki Kaisha, Osaka, Japan

[21] Appl. No.: 831,509

[22] Filed: Feb. 21, 1986

[51] Int. Cl.[4] ........................................... C08F 228/02
[52] U.S. Cl. ..................................... 526/243; 525/387
[58] Field of Search ................................. 526/243, 247

[56] References Cited

U.S. PATENT DOCUMENTS

| | | | |
|---|---|---|---|
| 4,151,053 | 4/1979 | Seko et al. | 521/29 |
| 4,166,014 | 8/1979 | Sata et al. | 204/98 |
| 4,576,752 | 3/1986 | Krespan | 526/243 |

FOREIGN PATENT DOCUMENTS 0041737  6/1981  European Pat. Off. .

OTHER PUBLICATIONS

EP 41,735, Dec. 16, 1981, to Dow Chem.

Primary Examiner—Christopher Henderson
Attorney, Agent, or Firm—Birch, Stewart, Kolasch & Birch

[57] ABSTRACT

A novel fluorine-containing crosslinkable copolymer comprising fluorine-containing monomer units each having a sulfonyl chloride group and monomer units of at least one ethylenically unsaturated compound is disclosed. The present fluorine-containing crosslinkable copolymer has a specific range of a sulfonyl chloride group content and can be easily crosslinked to give a fluorine-containing elastomer which is excellent in heat resistance and chemicals resistance.

1 Claim, No Drawings

FLUORINE-CONTAINING SULFONYL POLYMER

This invention relates to a novel fluorine-containing crosslinkable copolymer. More particularly, the present invention is concerned with a fluorine-containing crosslinkable copolymer comprising fluorine-containing monomer units each having a sulfonyl chloride group and monomer units of at least one ethylenically unsaturated compound, which can be easily crosslinked to give a crosslinked elastomeric product which has excellent heat resistance and chemical resistance.

In recent years, various fluorine-containing plastic products and elastomeric products have been used in a variety of industrial fields such as the auto industry, shipping industry, aircraft industry, hydraulic equipment industry and the other machine industries and in the fields associated with prevention of environmental pollution, because of their excellent heat resistance, solvent resistance and corrosion resistance. The range of their use has been expanded and, therefore, the demand for fluorine-containing plastic products and elastomeric products has been increased.

The fluorine-containing plastic products and elastomeric products are produced from a fluorine-containing polymer. Therefore, various studies have been made with a view to developing a fluorine-containing polymer which is useful to give a plastic product or an elastomeric product having excellent properties, such as heat resistance, solvent resistance and corrosion resistance.

The present inventors also have made extensive and intensive studies to develop an excellent fluorine-containing polymer. As a result, it has been found that a fluorine-containing crosslinkable copolymer which comprises fluorine-containing monomer units each having a sulfonyl chloride group as an active group for crosslinking and monomer units of at least one ethylenically unsaturated compound and of which the sulfonyl chloride group content is in a specific range is capable of being easly crosslinked to give an elastomer which exhibits excellent heat resistance and chemical resistance. The present invention has been completed based on this novel finding.

It is, therefore, an object of the present invention to provide a novel fluorine-containing crosslinkable copolymer which is capable of being easily crosslinked to give an elastomer which is excellent in heat resistance and chemical resistance.

The foregoing and other objects, features and advantages of the present invention will be apparent to those skilled in the art from the following detailed description.

According to the present invention, there is provided a fluorine-containing crosslinkable copolymer comprising:

(A) fluorine-containing monomer units each having a sulfonyl chloride group and represented by the following general formula (I):

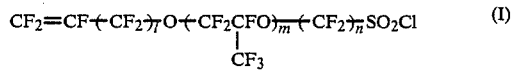

wherein l is 0 or 1, m is 0, 1 or 2, and n is an integer of from 1 to 4; and (B) monomer units of at least one ethylenically unsaturated compound represented by the following general formula (II):

wherein $X_1$ and $X_2$ each independently stand for a fluorine atom, a hydrogen atom or a chlorine atom, and $X_3$ and $X_4$ each independently stand for a fluorine atom, a hydrogen atom, a chlorine atom, a methyl group, a trifluoromethyl group, or a group represented by the following formula (III):

(wherein p is 0, 1 or 2 and q is an integer of from 1 to 3), and which copolymer has a sulfonyl chloride group content of about 0.1 to 3.0% by weight based on the total weight of (A) and (B) and has an intrinsic viscosity of at least 0.01 dl/g as measured at 30° C.

The fluorine-containing crosslinkable copolymer of the present invention contains sulfonyl chloride groups. The sulfonyl chloride groups serve as active groups for crosslinking. In the present invention, in order that the fluorine-containing copolymer may be easily crosslinked to give an excellent elastomer, it is requisite that the sulfonyl chloride group content of the copolymer be about 0.1 to about 3.0% by weight based on the total weight of copolymer constituents (A) and (B) which will be mentioned later. When the sulfonyl chloride group content is less than about 0.1% by weight, the amount of active groups for crosslinking is too small for the fluorine-containing copolymer to crosslink sufficiently and, therefore, an elastomer which is excellent in heat resistance and chemical resistance cannot be obtained. On the other hand, when the sulfonyl chloride group content exceeds about 3.0% by weight, the crosslink density of the crosslinked copolymer becomes high so that, as shown in the later-given Comparative Example 1 and Application Example, the elastomeric characteristics of the crosslinked copolymer become extremely poor, that is, the elongation of the crosslinked copolymer becomes considerably small and when the compressive stress is applied to the crosslinked copolymer, the crosslinked copolymer tends to be easily cracked. The sulfonyl chloride group content of the fluorine-containing copolymer may be determined by a customary infrared analysis method in which an infrared absorption at 1410 cm$^{-1}$ is measured.

With respect to fluorine-containing copolymers having sulfonyl chloride groups but having a sulfonyl chloride group content of more than about 3.0% by weight, there are conventionally known precursors for the production of ion exchange membranes. For example, sulfonic acid type ion exchange membranes and carboxylic acid type ion exchange membranes are produced utilizing the active sulfonyl chloride groups of fluorine-containing polymers having a sulfonyl chloride group content of about 5.0% by weight or more (U.S. Pat. Nos. 4,166,014 and 4,151,053). Such fluorine-containing polymers having sulfonyl chloride groups are prepared by subjecting fluorine-containing polymers having sulfonic group to chemical modification so that the sulfonic groups are converted to sulfonyl chloride groups. It should be noted, however, that in the production of the above-mentioned ion exchange membranes, the sulfonyl chloride groups of such fluorine-containing polymers are not utilized as active groups for crosslinking. Further, it should be noted that in the above-mentioned chemical modification of the sulfonic groups to sulfonyl chloride groups, due to the high reactivity and high diffusion of the modifying agent used in such a chemical modification, it is impossible to obtain a fluorine-containing polymer of which the sulfonyl chloride group content is controlled to an extent as small as about 0.1 to about 3.0% by weight and in which sulfonyl chloride group are uniformly distributed.

On the other hand, the present fluorine-containing crosslinkable copolymer having sulfonyl chloride groups is prepared by copolymerizing a fluorine-containing monomer having a sulfonyl chloride group with a monomer of at least one ethylenically unsaturated compound and, therefore, the sulfonyl chloride group content of the resulting copolymer can be easily controlled by changing the amount ratio of the fluorine-containing monomer having a sulfonyl chloride group to the monomer of at least one ethylenically unsaturated compound. Therefore, a fluorine-containing copolymer of which the sulfonyl chloride group content is as small as about 0.1 to 3% by weight and in which sulfonyl chloride groups are uniformly distributed can be easily obtained. From the fluorine-containing copolymer having a sulfonyl chloride group content of about 0.1 to 3% by weight, there can be obtained a crosslinked elastomeric product having excellent heat resistance and chemical resistance.

The copolymer constituent (A) of the fluorine-containing crosslinkable copolymer of the present invention is monomer units of a compound represented by the following general formula (I):

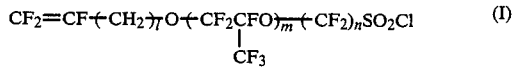

(wherein l is 0 or 1, m is 0, 1 or 2, and n is an integer of from 1 to 4)

Such a compound can be prepared from a known compound by a customary method. Such a compound can be readily synthesized from the corresponding fluorine-containing monomer compound having a sulfonyl fluoride group or a sulfonic group. For example, a compound represented by the above formula (I) in which l=0, m=0 and n=3 can be prepared as follows:

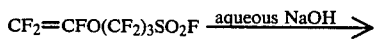

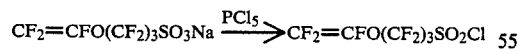

The copolymer constituent (B) of the fluorine-containing crosslinkable copolymer of the present invention is monomer units of at least one ethylenically unsaturated compound represented by the following general formula (II):

wherein $X_1$ and $X_2$ each independently stand for a fluorine atom, a hydrogen atom or a chlorine atom, and $X_3$ and $X_4$ each independently stand for a fluorine atom, a hydrogen atom, a chlorine atom, a methyl group, a trifluoromethyl group, or a group represented by the following formula (III):

(wherein p is 0, 1 or 2 and q is an integer of from 1 to 3).

As preferable examples of the ethylenically unsaturated compound, there may be mentioned tetrafluoroethylene, hexafluoropropylene, a perfluoroalkylperfluorovinyl ether, vinylidene fluoride, ethylene, propylene, pentafluoropropylene and chlorotrifluoroethylene. They may be employed alone or in mixture. In order to attain the effect of the present invention, it is preferable that two or more kinds of the above-mentioned ethylenically unsaturated compounds, in combination, be employed as the copolymer constituent (B). In this connection, it is noted that when a monomer compound which has relatively poor polymerizability such as hexafluoropropylene is chosen as the constituent (B), another monomer compound which has good polymerizability such as tetrafluoroethylene should preferably be used in combination therewith.

As preferable combinations of the ethylenically unsaturated compounds, there may be mentioned (1) a combination of tetrafluoroethylene and a perfluoroalkylperfluorovinyl ether, (2) a combination of vinylidene fluoride, hexafluoropropylene, tetrafluoroethylene and a perfluoroalkylperfluorovinyl ether, (3) a combination of vinylidene fluoride and hexafluoropropylene, and (4) a combination of tetrafluoroethylene, vinylidene fluoride and hexafluoropropylene. Of them, a combination of tetrafluoroethylene and a perfluoroalkylperfluorovinyl ether represented by the general formula $CF_2=CFO(CF_2)_nCF_3$ (wherein n is 0, 1 or 2) is most preferable as the copolymer constituent (B).

In order to provide a fluorine-containing crosslinkable copolymer which, upon being crosslinked, is capable of giving an elastomer having the desired properties, it is preferred that the following combination of ethylenically unsaturated compounds be used as the constituent (B):

(1) 50 to 85% by mole of tetrafluoroethylene and 15 to 50% by mole of a perfluoroalkylperfluorovinyl ether, based on the total mole of (A) and (B), (2) 40 to 75% by mole of vinylidene fluoride, 0 to 30% by mole of hexafluoropropylene, 0 to 25% by mole of tetrafluoroethylene and 0 to 20% by mole of a perfluoroalkylperfluorovinyl ether, based on the total mole of (A) and (B), (3) 70 to 80% by mole of vinylidene fluoride and 20 to 30% by mole of hexafluoropropylene, based on the total mole of (A) and (B), or (4) 15 to 20% by mole of tetrafluoroethylene, 60 to 65% by mole of vinylidene fluoride, and 15 to 25% by mole of hexafluoropropylene, based on the total mole of (A) and (B).

It is most preferable to employ, as the constituent (B), a combination of 50 to 85% by mole of tetrafluoroethylene and 15 to 50% by mole of a perfluoroalkylperfluorovinyl ether, based on the total mole of (A) and (B).

As is apparent from the above, the preferable ethylenically unsaturated compound is a fluorine-containing ethylenically unsaturated compound having no C-H bond or having few C-H bonds. Such ethylenically unsaturated compounds have, on one hand, an advantage that when the ethylenically unsaturated compound is used as a constituent of a copolymer, the copolymer is capable of giving an elastomer having the desired properties. On the other hand, such ethylenically unsaturated compounds have a disadvantage that the ethylenically unsaturated compound has no active groups or few active groups for crosslinking and, therefore, it is difficult to crosslink a copolymer comprising the ethylenically unsaturated compound. According to the present invention, however, the copolymer is prepared by copolymerizing the ethylenically unsaturated compound with the fluorine-containing monomer having a sulfonyl chloride group, that is, the copolymer of the present invention has sulfonyl chloride groups as active groups for crosslinking. Therefore, the copolymer of the present invention can be easily crosslinked to give an elastomer having the desired properties.

As mentioned above, the fluorine-containing crosslinkable copolymer of the present invention is prepared by copolymerizing the fluorine-containing monomer having a sulfonyl chloride group and the monomer of at least one ethylenically unsaturated compound. The copolymerization may be performed in the presence of a free radical initiator according to known polymerization methods such as a bulk polymerization method, a suspension polymerization method, a emulsion polymerization method, a solution polymerization method and the like. In this connection, however, if the copolymerization is performed using an aqueous solvent according to an emulsion polymerization method, a suspension polymerization method or a solution polymerization method, the decomposition of sulfonyl chloride groups may occur to some extent. Therefore, when the copolymerization is carried out according to the suspension polymerization method, emulsion polymerization method or solution polymerization method, it is preferred to carry out the copolymerization in an organic solvent.

As examples of the organic free radical initiator which can be used for preparing the copolymer of the present invention, there may be mentioned, for example, azobisisobutyronitrile, benzoyl peroxide and fluorine type free radical initiators such as perfluorobutanoyl peroxide. Of them, perfluorobutanoyl peroxide may be most preferable. The amount of the organic free radical initiator may be varied depending on the kind of the free radical initiator, the temperature and the polymerizability of the monomers. But, in general, the amount of the initiator may be in the range of about 0.005 to 0.5% by weight based on the total weight of the reaction system.

As the organic solvent which can be used in the copolymerization, it is preferred to employ such a solvent as will not act as a chain transfer agent and is capable of dissolving the monomers used and the copolymers formed. As examples of such an organic solvent, there may be mentioned halogenated hydrocarbons such as 1,1,2-trichloro-1,2,2-trifluoroethane, 1,2-dichloro-1,1,2,2-tetrafluoroethane, trichlorofluoromethane, dichlorodifluoromethane, perfluorocyclobutane and the like.

The reaction conditions such as polymerization pressure and polymerization temperature may be widely varied depending on the composition of the intended copolymer, the kind of free-radical initiator and the kind of polymerization method. But, the copolymerization reaction may generally be effected at a temperature of 20° to 90° C. under a pressure of 1.0 to 50 kg/cm²-Gauge.

The thus prepared fluorine-containing crosslinkable copolymer of the present invention essentially comprises the monomer units (A) and (B). However, the copolymer of the present invention may contain a small amount of the other compounds, such as an organic free radical initiator.

With respect to the thus obtained fluorine-containing crosslinkable copolymer of the present invention, the determination of sulfonyl chloride group content and the amount of each monomer unit constituting the copolymer can be made by a customary infrared absorption analysis, an elemental analysis, a $^{19}$F-NMR analysis and the like.

The fluorine-containing crosslinkable copolymer of the present invention has an intrinsic viscosity of at least 0.01 dl/g, preferably 0.1 to 3.0 dl/g as measured at 30° C. The intrinsic viscosity can be obtained from the values of the solution viscosities. The solution viscosities are obtained by measuring the viscosities of the solutions of the copolymer by means of an Ostwald's viscometer. The solutions of the copolymer are prepared by dissolving 0.1 g of the copolymer in 100 g of 2,3-dichlorooctafluorobutane.

The fluorine-containing copolymer of the present invention can be crosslinked with the aid of an organic peroxide, heat, light, radioactive rays or the like utilizing the chemical reactivity of sulfonyl chloride groups. It is most preferred that the crosslinking reaction be effected using an organic peroxide.

As the organic peroxide, there may be mentioned such dialkyl peroxides as serve as a crosslinking agent at an elevated temperature but will not cause any crosslinking during the preliminary procedure such as blending of the copolymer with the peroxide and the subsequent kneading. As suitable examples of such organic peroxide, there may be mentioned, 2,5-dimethyl-2,5-di(t-butylperoxy)hexane, 2,5-dimethyl-2,5-di(t-butylperoxy)hexyne, 1,3-di(t-butylperoxyisopropyl)benzene, 1,1-di(t-butylperoxy)-3,3,5-trimethylcyclohexane and the like. These organic peroxides may usually be employed in an amount of 0.5 to 5% by weight based on the weight of the copolymer of the present invention.

For performing sufficient crosslinking of the copolymer, it is preferred that an auxiliary crosslinking agent be used in combination with the organic peroxide. As the auxiliary crosslinking agent, it is preferred to employ multi-functional compounds which coact with the organic peroxide. As such multifunctional compounds, there may be mentioned, for example, triallyl isocyanurate, triallyl cyanurate, triallyl phosphite, N,N,N',N'-tetraallylterephthal amide and the like. Of them, triallyl isocyanurate is most preferable. The auxiliary crosslinking agent may be employed in an amount of 0.5 to 7% by weight based on the weight of the copolymer.

The crosslinking of the fluorine-containing copolymer of the present invention may be effected as follows. First, to the copolymer of the present invention are added the above-mentioned organic peroxide and auxiliary crosslinking agent, and, according to need, known additives such as a metal oxide, a metal hydroxide and carbon black, and the resulting mixture is sufficiently kneaded using a roll, a Banbury type mixer or the like to form a homogeneous composition. Second, the thus-obtained composition is heated at a temperature of 120° to 200° C. for 1 to 60 minutes by means of a press, mold or extruder, thereby to perform primary crosslinking of the copolymer. Thereafter, if desired, the copolymer thus primarily crosslinked may preferably be further heated at a temperature of 160° to 300° C. for 1 to 48 hours, thereby to perform secondary crosslinking of the copolymer so that the thermal stability and dimensional stability of the crosslinked product can be improved. Thus, there is obtained an fluorine-containing elastomer having excellent properties, such as heat resistance and chemicals resistance.

The novel fluorine-containing copolymer of the present invention has sulfonyl chloride groups as active groups for crosslinking. Due to the presence of the sulfonyl chloride groups, the fluorine-containing copolymer of the present invention can be easily crosslinked to give an elastomer. The thus obtained elastomer has excellent properties, such as creep resistance, heat resistance, solvent resistance, etc. Therefore, it is expected that by the use of the copolymer of the present invention, there can be advantageously obtained fluorine-containing elastomers useful in the fields of auto industry, shipping industry, aircraft industry, hydraulic equipment industry and the other machine industries, and in the fields associated with prevention of environmental pollution.

The present invention will now be described in detail with reference to the following Referential Example, Examples and Comparative Example, which should not be construed to be limiting the scope of the present invention.

REFERENTIAL EXAMPLE

Production of perfluoro(3-chlorosulfonyl)propylvinyl ether [$CF_2=CFO(CF_2)_3SO_2Cl$]

Into a three-necked flask equipped with a stirrer and having a capacity of 1 liter is charged 400 g of a 15% by weight aqueous NaOH solution and the inner temperature of the flask is kept at 50° C. by means of a water bath. 245 g of $CF_2=CFO(CF_2)_3SO_2F$ is gently dropwise added to the flask while stirring. The reaction proceeds smoothly and after 3 hours, the reaction is completed. After the water in the obtained reaction mixture is removed by means of an evaporator, the solid residue is dried under reduced pressure at 80° C. for 40 hours. Thus, there is obtained 290 g of a white powder. The white powder sample is subjected to infrared absorption analysis to obtain the infrared absorption spectrum. Illustratively stated, a sample is applied to a KBr plate, and another KBr plate is covered over the sample-applied plate to sandwich the sample therebetween. Then, using IR-440 (trade name of an infrared spectrometer manufactured by Shimadzu Corporation, Japan), IR spectrum is taken at room temperature between the wavelengths of 5040 $cm^{-1}$ and 400 $cm^{-1}$. The examination of the IR spectrum shows that the sample exhibits a strong absorption at 1050 $cm^{-1}$ attributed to —$SO_3Na$.

Into a three-necked flask equipped with a stirrer and having a capacity of 1 liter are added 290 g of the above-obtained white powder and, then, 313 g of phosphorus pentachloride and 100 g of phosphorus oxychloride. The flask is heated by means of an oil bath to raise the inner temperature of the flask gradually, while gently stirring, to 120° C. over 2 hours, and the reaction is allowed to proceed at this temperature for 16 hours.

After completion of the reaction, the reaction mixture is cooled and poured into water little by little to hydrolyze the phosphorous oxychloride and the excess of phosphorous pentachloride. The mixture is allowed to stand to separate into two layers. After the separation into two layer, the lower layer is collected and distilled under reduced pressure to obtain 175 g of a distillate having a boiling point of 72° C. (80 mmHg).

The obtained distillate is a transparent, colorless and odorless liquid. Infrared absorption spectrum with respect to the distillate is obtained in substantially the same manner as described above. As a result, it is found that the distillate shows an absorption at 1840 $cm^{-1}$ attributed to the vinyl ether group and an absorption at 1410 $cm^{-1}$ attributed to the sulfonyl chloride group. The purity of the product is determined using GC-3BT (trade name of an apparatus for gas chromatography manufactured by Shimadzu Corporation, Japan) under the following conditions:

Detector: Thermal conductivity detector (TCD)
Carrier gas: He gas
Solid support: KRYTOX/Chromosorb (trade name of a solid support, manufactured and sold by E. I. Du Pont de Namours and Company, U.S.A.) (column length: 3 m)
Column temperature: 120° C.

As a result, it is found that the purity of the product is 99%. The results of the elemental analysis of the product are well in agreement with the calculated values as follows:

| Element | C | F | S | Cl |
| --- | --- | --- | --- | --- |
| Calculated: | 17.3% | 49.35% | 9.25% | 10.25% |
| Found: | 17.2% | 49.2% | 9.3% | 10.4% |

EXAMPLE 1

After the air in an autoclave having a capacity of 3 liters and made of a stainless steel is completely replaced by nitrogen gas, the autoclave is evacuated to remove the nitrogen gas. Then, 1500 g of perfluoropropylperfluorovinyl ether (hereinafter referred to as "PPVE") and 18 g of perfluoro[3-(chlorosulfonyl)propylvinyl ether](hereinafter referred to as "3-CSVE") are charged into the autoclave and are gently stirred at 25° C. Then, 1.5 g of perfluorobutanoyl peroxide (hereinafter referred to as "PBP") is poured into the autoclave by means of a glass ampule and, thereafter, tetrafluoroethylene (hereinafter referred to as "TFE") is introduced into the autoclave until the inner pressure of the autoclave becomes 4.8 $kg/cm^2$ so that the polymerization reaction is caused to start. The polymerization reaction is effected while stirring at 300 rpm.

Since the pressure is gradually decreased with the progress of the polymerization reaction, the pressure is maintained at 4.8 $kg/cm^2$ by adding TFE gas. The polymerization reaction is stopped 7 hours after the start of the polymerization reaction. The total amount of TFE gas introduced into the autoclave is 65 g.

Then, TFE, PPVE and 3-CSVE which remain unreacted are removed from the autoclave to obtain a solid residue. The solid residue is washed with Freon 113 (manufactured and sold by E. I. du Pont de Namours and Company, U.S.A.), and dried under vacuum at 90° C. to obtain 150 g of a white elastic copolymer of TFE-PPVE-3-CSVE.

The obtained copolymer is subjected to elemental analysis and infrared absorption analysis to determine the composition of the copolymer and the sulfonyl chloride group content of the copolymer. As a result, it is found that the obtained copolymer comprises 65.5% by mole of TFE monomer unit, 33.5% by mole of PPVE monomer unit and 1.0% by mole of 3-CSVE. The sulfonyl chloride group content of the copolymer is found to be 0.63% by weight based on the copolymer. The intrinsic viscosity of the copolymer is 0.65 dl/g at 30° C.

Comparative Example 1

Substantially the same procedures as in Example 1 are repeated except that instead of 18 g of 3-CSVE, 100 g of 3-CSVE is charged, to obtain 155 g of white elastic copolymer of TFE-PPVE-3-CSVE.

It is found that the obtained copolymer comprises 62.0% by mole of TFE monomer unit, 32.0% by mole of PPVE monomer unit and 6.0% by mole of 3-CSVE. The intrinsic viscosity and sulfonyl chloride group content of the obtained copolymer are found to be 0.55 dl/g at 30° C. and 3.53% by weight based on the total weight of the copolymer, respectively.

EXAMPLE 2

The air in an autoclave having a capacity of 3 liters and made of a stainless steel is completely removed. Then, 2000 g of 1,1,2-trichloro-1,2,2-trifluoroethane (hereinafter referred to as "R-113"), 1000 g of PPVE and 40 g of 3-CSVE are charged into the autoclave and gently stirred at 25° C. Then, 2.15 g of PBP is poured into the autoclave by means of a glass ampule and, thereafter, TFE is introduced into the autoclave until the inner pressure of the autoclave becomes 1.8 kg/cm$^2$ so that the polymerization reaction is caused to start. The polymerization reaction is effected while stirring at 300 rpm.

Since the TFE pressure is gradually decreased with the progress of polymerization reaction, the pressure is maintained at 1.8 g/cm$^2$ by adding TFE. The polymerization reaction is completed 20 hours after the start of polymerization reaction.

Then, TFE, PPVE and 3-CSVE which remain unreacted are removed from the autoclave to obtain a solid residue. The solid residue is washed with Freon 113 (manufactured and sold by E. I. Du Pont de Namours and Company, U.S.A.), and dried under vacuum at 90° C. to obtain 250 g of a white elastic copolymer of TFE-PPVE3-CSVE.

It is found that the obtained copolymer comprises 65% by mole of TFE monomer unit, 33.5% by mole of PPVE monomer unit and 1.5% by mole of 3-CSVE monomer unit. The intrinsic viscosity and sulfonyl chloride group content of the obtained copolymer are found to be 0.55 dl/g at 30° C. and 0.94% by weight based on the total weight of the copolymer, respectively.

EXAMPLE 3

The air in an autoclave having a capacity of 3 liters is completely removed. Then, 2500 g of R-113 and 12 g of 3-CSVE are charged into the autoclave and gently stirred at 25° C. Separately, 0.5 g of PBP is dissolved in 10 g of R-113 to obtain a solution. The thus-obtained solution is poured into the autoclave by means of a glass ampule. Then, a gas mixture consisting of 43.4% by mole of vinyldene fluoride (hereinafter referred to as "VdF") and 56.6% by mole of hexafluoropropylene (hereinafter referred to as "HFP") is introduced into the autoclave until the inner pressure of the autoclave becomes 10 kg/cm$^2$ so that the polymerization reaction is caused to start. The polymerization reaction is effected while stirring at 300 rpm. Since the pressure is decreased with the progress of polymerization reaction, the pressure is maintained at 10 kg/cm$^2$ by adding a gas mixture consisting of 76.8% by mole of VdF and 23.2% by mole of HFP. The polymerization reaction is completed 7 hours after the start of polymerization reaction.

Then, VdF, HFP and 3-CSVE which remain unreacted are removed from the autoclave to obtain a solid residue. The solid residue is washed with Freon 113 (manufactured and sold by E. I. Du Pont de Namours and Company, U.S.A.), and dried under vacuum at 90° C. to obtain 80 g of a white elastic copolymer of VdF-HFP-3-CSVE.

The obtained copolymer is subjected to $^{19}$F-NMR analysis. As a result, it is found that the copolymer comprises 72% by mole of VdF monomer unit, 27.3% by mole of HFP monomer unit and 0.7% by mole of 3-CSVE monomer unit. The intrinsic viscosity of the copolymer is determined in methyl ethyl ketone at 35° C. and found to be 0.6 dl/g. The sulfonyl chloride group content of the copolymer is found to be 0.77% by weight based on the total weight of the copolymer.

EXAMPLE 4

The air in an autoclave having a capacity of 3 liters is completely removed. Then, 2500 g of R-113, 12 g of 3-CSVE and 0.5 g of PBP are charged into an autoclave. While gently stirring at 25° C., a gas mixture consisting of 55% by mole of TFE and 45% by mole of perfluoromethylperfluorovinyl ether (hereinafter referred to as "PMVE") is introduced into the autoclave until the inner pressure of the autoclave becomes 8 kg/cm$^2$ so that the polymerization reaction is caused to start. The polymerization reaction is carried out while stirring at 300 rpm. The polymerization reaction is completed 5 hours after the start of polymerization reaction. Then, TFE PMVE and 3-CSVE which remain unreacted are removed from the autoclave to obtain a solid residue. The solid residue is washed with Freon 113 (manufactured and sold by E. I. Du Pont de Namours and Company, U.S.A.), and dried under vacuum at 90° C. to obtain 48 g of a white elastic copolymer of TFE-PMVE-3-CSVE.

The obtained copolymer is subjected to infrared absorption analysis and it is found that the copolymer comprises 66.5% by mole of TFE monomer unit, 33% by mole of PMVE monomer unit and 0.5% by mole of 3-CSVE monomer unit. The sulfonyl chloride group content of the copolymer is found to be 0.42% by weight based on the total weight of the copolymer.

EXAMPLE 5

In substantially the same manner as in Referential Example, perfluoro[2-(2-chlorosulfonylethoxy)]propylvinyl ether (hereinafter referred to as "2-CSEVE") is synthesized from perfluoro[2-(2-fluorosulfonylethoxy)]-propylvinyl ether.

After the air in an autoclave having a capacity of 3 liters and made of a stainless steel is completely replaced by nitrogen gas, the autoclave is evacuated to remove the nitrogen gas. Then, 1500 g of PPVE and 2 g of the above-obtained 2-CSEVE are charged into the autoclave and are gently stirred at 25° C. Then, TFE is introduced into the autoclave until the inner pressure of the autoclave becomes 4.8 kg/cm$^2$. Subsequently, 1.5 g of PBP as a polymerization initiator is added so that the polymerization reaction is caused to start. The polymerization reaction is terminated 7 hours after the start of polymerization reaction. The monomers remaining unreacted are recovered and 150 g of a white elastic copolymer of TFE-PPVE-2-CSEVE is obtained.

It is found that the copolymer comprises 65.5% by mole of TFE monomer unit, 33.3% by mole of PPVE monomer unit and 1.2% by mole of 2-CSEVE. The sulfonyl chloride group content of the copolymer is found to be 0.8% by weight based on the total weight of the copolymer.

thickness of the product is measured. The Compression set (%) is calculated by the following equation:

$$\text{Compression set (\%)} = \frac{2.54 - l_1}{2} \times 100$$

($l_1$ is the thickness of the product after the compressive stress is removed).

The results are shown in Table below.

TABLE

|  |  | Comparative Example 1 | Example No. 1 | 2 | 3 | 4 | 5 | 6 |
|---|---|---|---|---|---|---|---|---|
| Composition (part by weight) | Copolymer | 100 | 100 | 100 | 100 | 100 | 100 | 100 |
|  | SAF Carbon black | 10 | 10 | 10 | 20[5] | 10 | 10 | 10 |
|  | Perhexa-25B[1] | 4 | 4 | 4 | 4 | 3 | 4 | 4 |
|  | Triallyl isocyanurate | 4 | 4 | 4 | 4 | 3 | 3 | 3 |
|  | Lead monooxide | 3 | 3 | 3 | 3 | 3 | 3 | 3 |
| Curing characteristics (177° C.)[2] | Minimum viscosity (Kg · cm) | 2.5 | 2.0 | 1.8 | 1.3 | 1.5 | 2.0 | 1.9 |
|  | Scorch time (min) | 1.5 | 1.9 | 2.0 | 2.5 | 2.0 | 1.9 | 1.9 |
|  | Degree of curing (Kg · cm) | 46 | 24 | 22 | 27 | 17 | 24 | 24 |
|  | Optimum curing time (min) | 3.5 | 4.0 | 4.0 | 4.5 | 4.0 | 4.0 | 4.0 |
| Curing | Primary curing | 177° C. 10 min | " | " | " | " | " | " |
|  | Secondary curing (under N₂ stream) | 200° C. 1 hr, 232° C. 20 hrs | " | " | " | " | " | " |
| Mechanical properties[3] | 100% modulus (Kg/cm²) | — | 85 | 80 | 25 | 75 | 85 | 82 |
|  | Tensile strength (Kg/cm²) | 160 | 120 | 120 | 200 | 110 | 120 | 118 |
|  | Elongation (%) | 85 | 135 | 140 | 430 | 160 | 135 | 140 |
|  | Compression set (B method) (%)[4] | not obtainable | 65 | 70 | 50 | 72 | 65 | 68 |

Note:
[1]Trade name of a product containing 40% of 2,5-dimethyl-2,5-di(t-butylperoxy)hexane.
[2]determined using a osillating disc rheometer manufactured by Toyo Seiki Co., Ltd., Japan.
[3]determined according to Japanese Industrial Standards K-6301.
[4]determined using an O-ring specimen having an outer diameter of 25.4 mm and a thickness of 2.54 mm (compressed at 200° C. for 70 hours).
[5]MT carbon black is used.

EXAMPLE 6

Substantially the same procedures as in Example 5 are repeated except that perfluoro[2-(3-chlorosulfonylpropoxy)]propylvinyl ether (hereinafter referred to as "3-CSPVE") is used instead of 2-CSEVE. Thus, there is obtained a white elastic copolymer of TFE-PPVE-3-CSPVE.

It is found that the copolymer comprises 65.5% by mole of TFE, 33.3% by mole of PPVE and 1.2% by mole of 3-CSPVE and that the sulfonyl chloride group content of the copolymer is 0.75% by weight based on the total weight of the copolymer.

Application Example (Cure of copolymers)

Each of the copolymers obtained in Examples 1 to 6 and Comparative Example 1 is separately mixed with various additives by means of a rubber roll as indicated in Table below. Then, the obtained compositions are subjected to press curing and, then, to post-curing under the conditions indicated in the same table. With respect to the obtained cured products, the curing characteristics of the products are examined using an oscillating disc rheometer (ODR) and the mechanical properties of the products are examined according to the Japanese Industrial Standards K-6301.

With respect to the measurement of the compression set, the following method is employed. The composition is shaped into an O-ring having an outer diameter of 25.4 mm and a thickness of 2.54 mm. The compressive stress is applied to the O-ring-shaped specimen in the direction in parallel with the axis of the O-ring product until the thickness of the O-ring specimen becomes 0.54 mm. The compression is effected at 200° C. for 70 hours. Then, the compressive stress is removed and the The thus obtained elastomers no longer dissolve in a solvent such as 2,3-dichlorooctabutane in which the copolymers before curing can dissolve.

As is apparent from the curing characteristic determined by the rheometer, an extremely rapid and large increase in torque is observed with respect to the fluorine-containing copolymers of the present invention, suggesting that a crosslinking reaction proceeds readily and sufficiently with respect to the fluorine-containing copolymers of the present invention.

Further, with respect to the mechanical properties, the cured copolymer obtained by curing the copolymer of Comparative Example 1 which has a sulfonyl chloride group content of 3.53% by weight based on the total weight of the copolymer shows an elongation as small as 85%, and cracking of a sample of the cured copolymer occurs during determination of compression set so that compression set of the cured copolymer cannot be determined. On the other hand, the cured copolymers obtained by curing the copolymers of Examples 1 to 6 have good mechanical properties.

EXAMPLE 7

Substantially the same procedures as in Example 5 are repeated except that perfluoro(2-chlorosulfonylethylallyl ether) (hereinafter referred to as "2-CSAE") is used instead of 2-CSEVE Thus, there is obtained a white elastic copolymer of TFE-PPVE-2-CSAE. The sulfonyl chloride group content of the obtained copolymer is 0.8% by weight based on the total weight of the copolymer.

The obtained copolymer can be readily crosslinked as in the cases of Examples 1 to 6, and the resulting cured copolymer shows mechanical properties and curing characteristic similar to those of the cured copolymers obtained by curing the copolymers of Examples 1 to 6.

EXAMPLE 8

Substantially the same procedures as in Example 1 are repeated except that 65 g of 3-CSVE is used instead of 18 g of 3-CSVE Thus, there is obtained a copolymer of TFE-PPVE-3-CSVE having a sulfonyl chloride group content of 2.3% by weight based on the total weight of the copolymer.

The obtained copolymer can be readily crosslinked as in the cases of Examples 1 to 6 and the resulting cured copolymer shows mechanical properties and curing characteristic similar to those of the cured copolymers obtained by curing the copolymers of Examples 1 to 6.

What is claimed is:

1. A fluorine-containing crosslinkable copolymer consisting essentially of:

(A) fluorine-containing monomer units each having a crosslinkable sulfonyl chloride group and represented by the general formula:

$$CF_2=CF(CF_2)_l O(CF_2CFO)_m(CF_2)_n SO_2Cl$$
   $$\quad\quad\quad\quad\quad\quad\quad\quad |$$
   $$\quad\quad\quad\quad\quad\quad\quad\quad CF_3$$

wherein l is 0 or 1, m is 0, 1 or 2, and n is an integer of from 1 to 4; and (B) monomer units of a combination of ethylenically unsaturated compounds selected from the group consisting of:

(1) 50 to 85% by mole of tetrafluoroethylene and 50 to 15% by mole of a perfluoroalkylperfluorovinyl ether represented by the formula $$CF_2=CF-(OCF_2CF)_p O(CF_2)_q F$$
   $$\quad\quad\quad\quad\quad\quad |$$
   $$\quad\quad\quad\quad\quad\quad CF_3$$

wherein p is 0, 1 or 2 and q is an integer of from 1 to 3, (2) 70 to 80% by mole of vinylidene fluoride and 30 to 20% by mole of hexafluoropropylene, and (3) 15 to 20% by mole of tetrafluoroethylene, 60 to 65% by mole of vinylidene fluoride, and 15 to 25% by mole of hexafluoropropylene, and wherein said copolymer has a sulfonyl chloride group content of about 0.1 to about 3.0% by weight based on the total weight of (A) and (B), and an intrinsic viscosity of at least 0.01 dl/g as measured at 30° C.

* * * * *